US012791699B2

(12) United States Patent
Elenes

(10) Patent No.: US 12,791,699 B2
(45) Date of Patent: Nov. 10, 2026

(54) METHOD FOR DISTANCE ESTIMATION IN THE PRESENCE OF MULTIPATH

(71) Applicant: Silicon Laboratories Inc., Austin, TX (US)

(72) Inventor: Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 204 days.

(21) Appl. No.: 18/769,932

(22) Filed: Jul. 11, 2024

(65) Prior Publication Data

US 2026/0016592 A1 Jan. 15, 2026

(51) Int. Cl.
*G01S 13/84* (2006.01)
*H04W 4/80* (2018.01)

(52) U.S. Cl.
CPC ............... *G01S 13/84* (2013.01); *H04W 4/80* (2018.02)

(58) Field of Classification Search
CPC ....................................................... G01S 13/84
USPC ........................................................... 342/458
See application file for complete search history.

(56) References Cited

U.S. PATENT DOCUMENTS

2020/0217947 A1* 7/2020 Stitt ................... G07C 9/00309
2025/0373347 A1* 12/2025 Gomez Martinez ......................... H04B 17/253

FOREIGN PATENT DOCUMENTS

CN 116634561 A * 8/2023 ............ H04W 64/00
CN 114994626 B * 6/2024 ............... G01S 7/41
WO WO-2020205364 A1 * 10/2020 ........... H01Q 9/0428

* cited by examiner

*Primary Examiner* — Cassi J Galt
(74) *Attorney, Agent, or Firm* — Nields, Lemack & Frame, LLC

(57) ABSTRACT

A system and method for determining the distance between two wireless network devices is disclosed. The present system utilizes an algorithm that leverages additional information contained in the pseudo-spectrum generated the MUSIC algorithm. Specifically, since the MUSIC algorithm operates using the square of the channel frequency response, additional peaks are created in the pseudo-spectrum, which can be used to verify the correctness of the distance measurement. The algorithm verifies that the first peak is correct by identifying a second peak and looking for an additional peak located within a search region that is determined based on the first two peaks.

17 Claims, 7 Drawing Sheets

METHOD FOR DISTANCE ESTIMATION IN THE PRESENCE OF MULTIPATH

FIELD

This disclosure describes systems and methods for determining the distance between two wireless network devices, and specifically, in the presence of multipath.

BACKGROUND

The Bluetooth protocol has designed several techniques to implement high accuracy distance measurement (HADM). These include a phase based ranging approach and a round trip time approach. Typically, there are two devices associated with these approaches; an initiator device that initiates the distance measurement and a reflector device, which responds to the initiator device. The distance being measured is the distance between these two devices.

In the round trip time (RTT) approach, each device uses timestamps. Specifically, when a packet is transmitted, the transmitting device records a transmit timestamp. When that packet arrives, a receive timestamp is used by the receiving device.

In the phase based approach, the initiator device determines the incoming phase for signals transmitted at two different frequencies. The phase measured ($\theta_{init}$) at the initiator device may be approximately the difference in phase between the two devices (i.e. $\Delta\theta_{ir}$), added to the product 2πf*(tp), where f is the frequency of the transmitted signal and tp is the trip delay. If this phase is measured at two different frequencies, and the difference is taken, the result is $(\theta_{init1})-(\theta_{init2})=2\pi*f1*(tp)-2\pi*f2*(tp)$, or $2*\pi*(f1-f2)*(tp)$. Based on this equation, the trip delay may be calculated and then converted to a distance. This approach may be enhanced through the use of the multiple signal classification (MUSIC) algorithm. The MUSIC algorithm uses this information to generate pseudo-spectrums which may be used to determine the distance between the two devices.

However, in the presence of noise and multipath, the pseudo-spectrum generated by the MUSIC algorithm may include false peaks. These false peaks may affect the accuracy of the distance measurement.

Consequently, an improved system and method would be beneficial. Further, it would be advantageous if the improved system is able to properly identify false peaks that may affect the distance measurement.

SUMMARY

A system and method for determining the distance between two wireless network devices is disclosed. The present system utilizes an algorithm that leverages additional information contained in the pseudo-spectrum generated by the MUSIC algorithm. Specifically, since the MUSIC algorithm operates using the square of the channel frequency response, additional peaks are created in the pseudo-spectrum, which can be used to verify the correctness of the distance measurement. The algorithm verifies that the first peak is correct by identifying a second peak and looking for an additional peak located within a search region that is determined based on the first two peaks.

According to one embodiment, a method of calculating a distance between two wireless network devices is disclosed. The method comprises performing a Channel Sounding procedure at a plurality of frequencies to obtain a channel transfer function; using the channel transfer function as an input to a MUSIC algorithm to generate a pseudo-spectrum, wherein the pseudo-spectrum comprises a plurality of peaks, each at a respective distance and having a respective amplitude; looking for a first peak, moving from 0 toward larger distances, in the pseudo-spectrum that has an amplitude greater than a first predetermined threshold; looking for a second peak, moving from the first peak toward larger distances, in the pseudo-spectrum that has an amplitude greater than the first predetermined threshold; creating a search region based on the respective distances associated with the first peak and the second peak; determining if a peak greater than a second predetermined threshold is present in the search region; and if so, using the distance associated with the first peak as the distance between the two wireless network devices. In some embodiments, if a peak greater than the second predetermined threshold is not present in the search region, the second peak is set as the first peak and the method further comprises: looking for the second peak in the pseudo-spectrum, moving from the first peak toward larger distances, that has an amplitude greater than the first predetermined threshold; creating a second search region based on the respective distances associated with the first peak and the second peak; determining if a peak greater than the second predetermined threshold is present in the second search region; and if so, using the distance associated with the first peak as the distance between the two wireless network devices. In some embodiments, the second predetermined threshold is equal to the first predetermined threshold. In some embodiments, the distance associated with the first peak is j, the distance associated with the second peak is k, and the search region includes a distance of 2k−j. In certain embodiments, the search region is defined as 2k−j±Δ, wherein Δ is a tolerance. In certain embodiments, Δ is a fixed distance. In certain embodiments, Δ is a percentage of 2k−j. In some embodiments, the two wireless network devices comprise Bluetooth network devices.

According to another embodiment, a Bluetooth network device is disclosed. The Bluetooth network device comprises a network interface; a processing unit; and a memory device in communication with the processing unit, comprising instructions, which when executed by the processing unit enable the Bluetooth network device to: perform a Channel Sounding procedure with a reflector device at a plurality of frequencies to obtain a channel transfer function; use the channel transfer function as an input to a MUSIC algorithm to generate a pseudo-spectrum, wherein the pseudo-spectrum comprises a plurality of peaks, each at a respective distance and having a respective amplitude; look for a first peak, moving from 0 toward larger distances, in the pseudo-spectrum that has an amplitude greater than a first predetermined threshold; look for a second peak, moving from the first peak toward larger distances, in the pseudo-spectrum that has an amplitude greater than the first predetermined threshold; create a search region based on the respective distances associated with the first peak and the second peak; determine if a peak greater than a second predetermined threshold is present in the search region; and if so, use the distance associated with the first peak as the distance between the Bluetooth network device and the reflector device. In some embodiments, the memory device further comprises instructions, which when executed by the processing unit, enable the Bluetooth network device to: set the second peak as the first peak if a peak greater than the second predetermined threshold is not present in the search region; look for the second peak in the pseudo-spectrum, moving from the first peak toward larger distances, that has an amplitude greater than the first predetermined threshold; create a second search region based on the respective distances associated with the first peak and the second peak; determine if a peak greater than the second predetermined threshold is present in the second search region; and if so, use the distance associated with the first peak as the distance between the Bluetooth network device and the reflector device. In some embodiments, the second predetermined threshold is equal to the first predetermined threshold. In some embodiments, the distance associated with the first peak is j, the distance associated with the second peak is k, and the search region includes a distance of 2k−j. In certain embodiments, the search region is defined as 2k−j±Δ, wherein Δ is a tolerance. In certain embodiments, Δ is a fixed distance. In certain embodiments, Δ is a percentage of 2k−j.

According to another embodiment, a network is disclosed. The network comprises a first Bluetooth network device acting as an initiator device; a second Bluetooth network device acting as a reflector device; and a computational device; wherein the first Bluetooth network device performs a Channel Sounding procedure with a reflector device at a plurality of frequencies to obtain a channel transfer function and forwards the channel transfer function to the computational device; and wherein the computational device: uses the channel transfer function as an input to a MUSIC algorithm to generate a pseudo-spectrum, wherein the pseudo-spectrum comprises a plurality of peaks, each at a respective distance and having a respective amplitude; looks for a first peak, moving from 0 toward larger distances, in the pseudo-spectrum that has an amplitude greater than a first predetermined threshold; looks for a second peak, moving from the first peak toward larger distances, in the pseudo-spectrum that has an amplitude greater than the first predetermined threshold; creates a search region based on the respective distances associated with the first peak and the second peak; determines if a peak greater than a second predetermined threshold is present in the search region; and if so, uses the distance associated with the first peak as the distance between the first Bluetooth network device and the second Bluetooth network device. In some embodiments, if a peak greater than the second predetermined threshold is not present in the search region, the second peak is set as the first peak and the computational device: looks for the second peak in the pseudo-spectrum, moving from the first peak toward larger distances, that has an amplitude greater than the first predetermined threshold; creates a second search region based on the respective distances associated with the first peak and the second peak; determines if a peak greater than the second predetermined threshold is present in the second search region; and if so, uses the distance associated with the first peak as the distance between the first Bluetooth network device and the second Bluetooth network device. In some embodiments, the distance associated with the first peak is j, the distance associated with the second peak is k, and the search region includes a distance of 2k−j. In certain embodiments, the search region is defined as 2k−j±Δ, wherein Δ is a tolerance. In certain embodiments, Δ is a fixed distance. In certain embodiments, Δ is a percentage of 2k−j.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
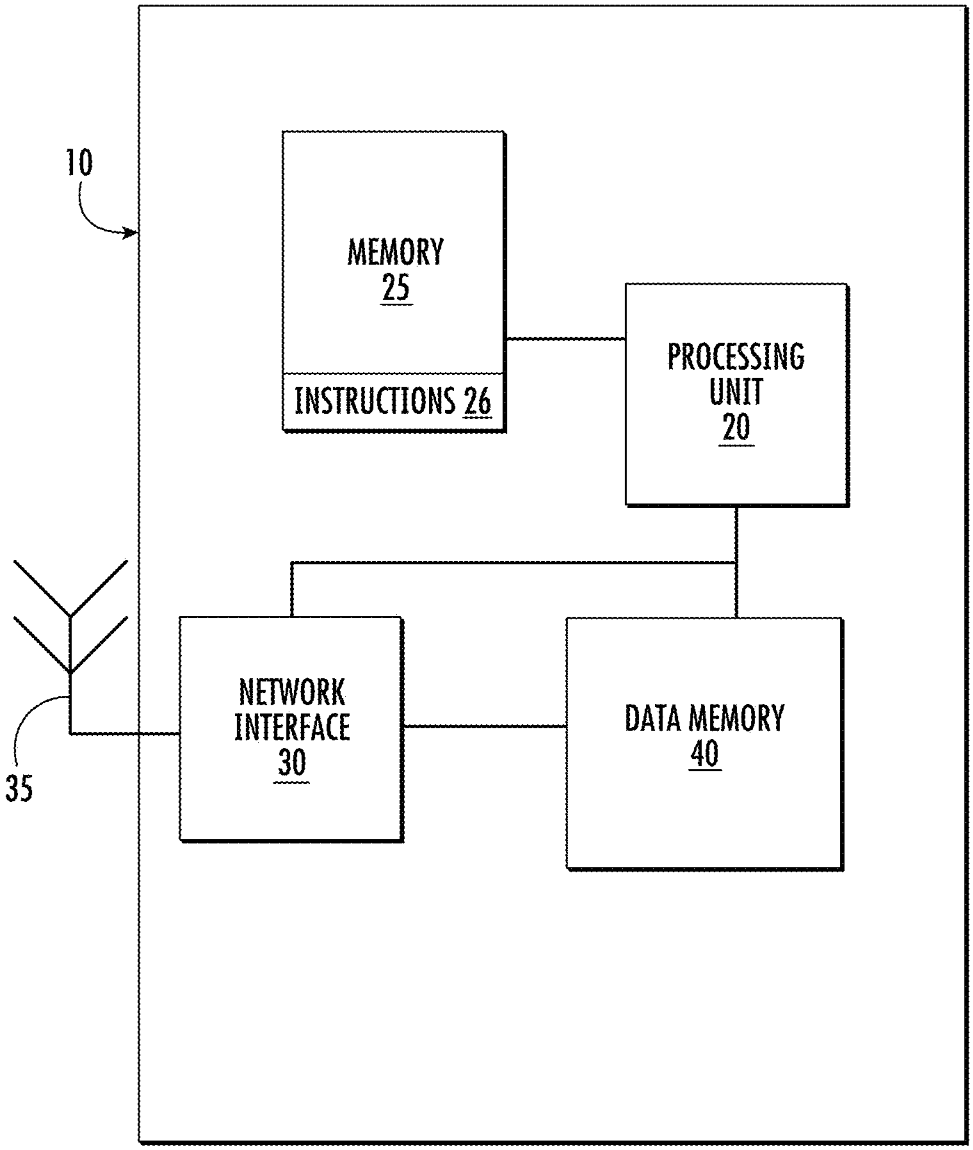
FIG. 1 is a block diagram of a representative initiator device that may estimate distance according to one embodiment.

FIG. 1 shows a block diagram of a representative network device. This network device may serve as an initiator device 10, as described in more detail below. This network device may also be used to determine the distance to a remote device, also referred to as a reflector device.

The initiator device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the initiator device 10 to perform the functions described herein. This memory device 25 may be a non-volatile memory, such as a FLASH ROM, an electrically erasable ROM or other suitable devices. In other embodiments, the memory device may be a volatile memory, such as a RAM or DRAM.

The initiator device 10 also includes a network interface 30, which may be a wireless interface including an antenna element 35.

The wireless signals first enter the network interface 30 through antenna element 35. The antenna element 35 is in electrical communication with a low noise amplifier (LNA). The LNA receives a very weak signal from the antenna element 35 and amplifies that signal while maintaining the signal-to-noise ratio (SNR) of the incoming signal. The amplified signal is then passed to a mixer. The mixer is also in communication with a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer are then fed into programmable gain amplifier (PGA). The PGA amplifies the $I_m$ and $Q_m$ signals by a programmable amount. These amplified signals may be referred to as $I_g$ and $Q_g$. The amplified signals, $I_g$ and $Q_g$, are then fed from the PGA into an analog to digital converter (ADC). The ADC converts these analog signals to digital signals, $I_d$ and $Q_d$. These digital signals may then pass through a channel filter. The filtered signals are referred to as I and Q. These I and Q signals can be used to recreate the amplitude and phase of the original signal.

The network interface 30 may support any wireless network, such as Bluetooth, Wi-Fi, networks utilizing the IEEE 802.15.4 specification, such as Zigbee, networks utilizing the IEEE 802.15.6 specification, and wireless smart home protocols, such as Z-Wave. The network interface 30 is used to allow the initiator device to communicate with other devices disposed on the network.

The initiator device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the network. Although not shown, the initiator device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions 26 may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the initiator device 10. The instructions contained on this second computer readable media may be downloaded onto the memory device 25 to allow execution of the instructions by the initiator device 10.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the initiator device 10, not its physical configuration.

Figure 2:
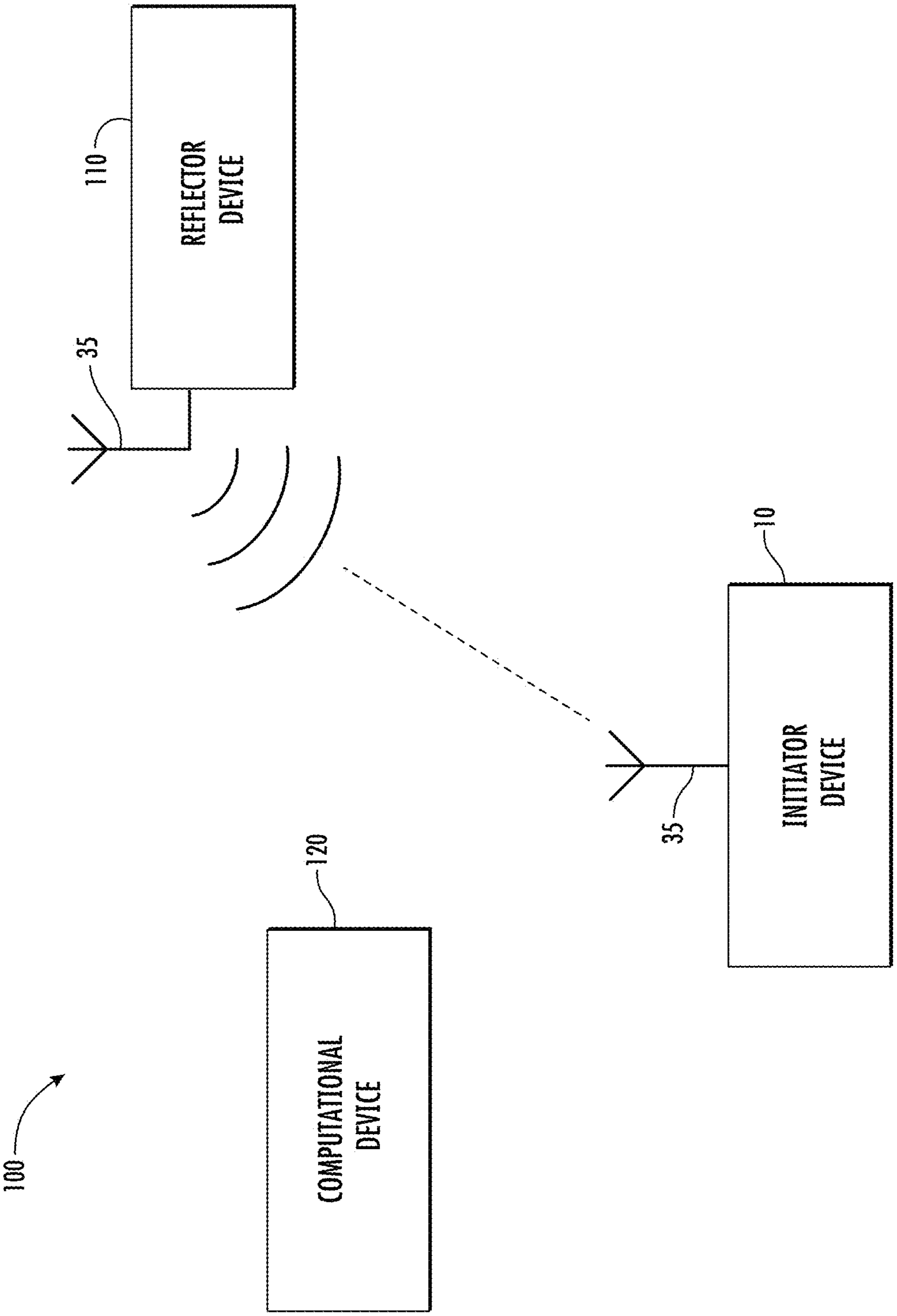
FIG. 2 shows a network having an initiator device and at least one reflector device according to one embodiment.

FIG. 2 shows a network 100 having at least one reflector device 110 and an initiator device 10. In certain embodiments, the reflector device 110 may be a network device and contain many of the components described above and shown in FIG. 1. However, the reflector device 110 may have a smaller amount of memory and may have less computational ability. A computational device 120 is also shown. This computational device 120 is optional, and when present is able to communicate with the initiator device 10. In some embodiments, the algorithms described herein are performed by the computational device 120.

In FIG. 2, the initiator device 10 may transmit a signal, containing a sine wave having a first frequency to the reflector device 110. In response, the reflector device 110 may transmit a signal containing a sine wave having the same first frequency toward the initiator device 10.

In certain embodiments, this signal is transmitted using a network protocol, such as Bluetooth.

The initiator device 10 may utilize the I and Q signals described above to determine the amplitude and phase of the signal arriving at the antenna element 35. This information may then be used to calculate the distance from the initiator device 10 to the reflector device 110.

Specifically, the Bluetooth specification now describes a Channel Sounding procedure, during which the initiator device 10 transmits a first signal at a first frequency to the reflector device 110. The reflector device 110 measures the magnitude and phase of the incoming first signal. In response, the reflector device 110 transmits a second signal having the first frequency back to the initiator device 10. The initiator device 10 measures the magnitude and phase of the incoming second signal. This may be repeated for a number of different frequencies. Based on the magnitude and phase information gathered by the initiator device and the reflector device 110, the channel transfer function (H) may be estimated. Note that the term "channel transfer function" is synonymous with "channel frequency response".

As a specific example, the Bluetooth specification defines the following procedure to determine the channel transfer function.

First, $\theta_{CH}(f)$ represents the phase delay of the channel, where f is the channel frequency, and $\Delta\theta_{LO}(f)$ represents the relative difference in phase of the RF carrier between the initiator device and the reflector device. Based on this, the relative phases of a carrier measured at the reflector and initiator's antenna is $\theta_{REFL}(f)=\theta_{CH}(f)+\Delta\theta_{LO}(f)$ and $\theta_{INIT}(f)=\theta_{CH}(f)-\Delta\theta_{LO}(f)$. $\Delta_{REFL}(f)$ and $A_{INIT}(f)$ represent the amplitude of that measured carrier at the reflector and initiator's antenna, respectively. Phase correction term (PCT) is defined by the angle that, if added to the internal angle of the local oscillator, would result in a phase identical to that of the incoming signal. The I and Q values represented by the PCT measured at the reflector and initiator, respectively, are given by $PCT_{REFL}(f)=\Delta_{REFL}(f)e^{i\theta}{}_{REFL}(f)$ and $PCT_{INIT}(f)=A_{INIT}(f)e^{i\theta}{}_{INIT}(f)$. If the communication channel is symmetrical between the initiator device 10 and the reflector device 110, the measured phases are dependent on both the communication channel and the relative difference in phase of the RF carrier between the devices. The communication channel transfer function can then be estimated from $H^2(f)=A_{REFL}(f)e^{i\theta}{}_{REFL}(f)\times A_{INIT}(f)e^{i\theta}{}_{INIT}(f)=A_{CH}{}^2(f)e^{i2\theta}{}_{CH}(f)$.

The channel transfer function may then be used to compute the distance between the initiator device 10 and the reflector device 110.

The MUSIC algorithm may be used to determine possible distances between two devices. For example, if the channel frequency response, defined as H(f), is provided to the MUSIC algorithm, the algorithm will generate a pseudo-spectrum, similar to that shown in FIG. 3. This pseudo-spectrum presents distance on the horizontal axis and amplitude, function, on the vertical axis. Higher amplitudes indicate higher likelihoods of this distance being possibly correct. Note that while the horizontal axis represents distance, this may be readily converted to time knowing that distance is equal to the speed of light multiplied by time.

Figure 3:
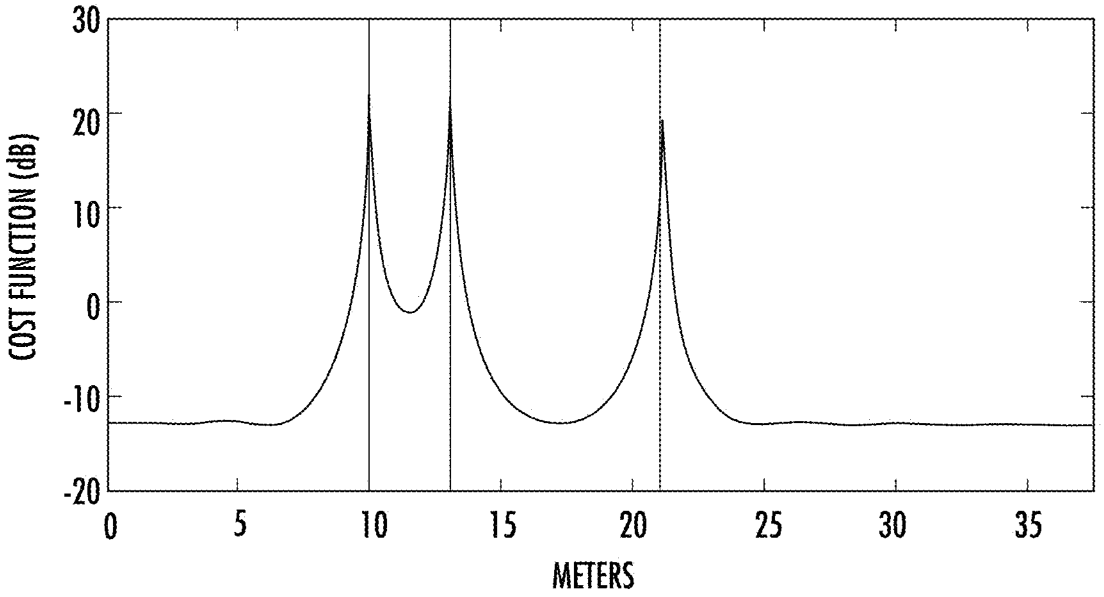
FIG. 3 shows a pseudo-spectrum generated from the channel frequency response.

Note in FIG. 3, there are three peaks, which correspond to 10 meters, 13 meters and 21 meters. Typically, the smallest distance that has a peak that is greater than a predetermined threshold is regarded as the line-of-sight distance between the two devices. The other peaks represent paths that are reflected off a surface or other object and are therefore longer. Thus, in this pseudo-spectrum, it may be assumed that the actual distance between the two devices is 10 meters, while 13 meters and 21 meters correspond to paths that include reflections.

However, the Channel Sounding procedure does not produce H(f); rather, it generates $H^2(f)$. In other words, the channel transfer function produced by the Channel Sounding procedure is equal to the channel frequency response, squared. The channel frequency response may be expressed as:

$$H(f) = \sum_k A_k e^{\varphi_k} e^{j2\pi f t_k}$$

where there are k complex exponentials, each having frequency $ft_k$, a magnitude $A_k$ and a phase shift $\varphi_k$.

Note that this channel response may also be expressed in the time domain as:

$$h(r) = \sum_k A_k e^{\varphi_k} \delta(t - t_k)$$

where there are k propagation paths, each with a time delay of $t_k$, a magnitude of $A_k$ and a phase shift of $\varphi_k$, and wherein $\delta(t-t_k)$ represents an impulse at time $t_k$.

Note that frequencies in the H(f) function correspond to time delays of the channel propagation in the time domain h(t).

Further, it is well known that squaring a function in the frequency domain is equivalent to convolving the function with itself in the time domain. Further, since the function in the time domain is a series of unit impulses, the resulting convolved function will also be a series of unit impulses. Convolving a function with a unit impulse results in a shifted version of that function. If that function is also a series of impulses, the result is a larger series of unit impulses, some located at the original locations, and others shifted based on the time between each pair of impulses.

As a specific example, assume a function in the time domain includes three unit impulses, at t1, t2 and t3. Convolving this function with itself will result in six unit impulses, the original three at $t_1$, $t_2$ and $t_3$, and shifted unit impulses at $(t_1+t_2)/2$, $(t_1+t_3)/2$ and $(t_2+t_3)/2$.

Figure 4:
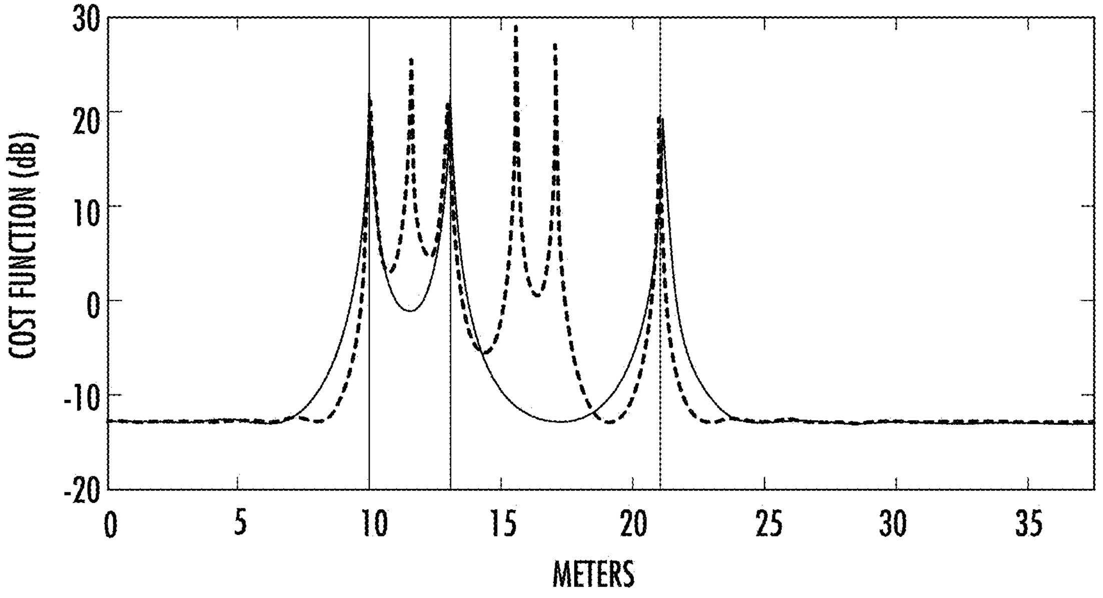
FIG. 4 shows a pseudo-spectrum generated from the channel transfer function, which is the square of the channel frequency response.

FIG. 4 shows, using dotted lines, the output of the MUSIC algorithm when $H^2(f)$ is provided as the input to the algorithm. The spectrum shown in FIG. 3 is also present and shown with solid lines. Note that there are peaks at 10 meters, 13 meters and 21 meters, as was shown in FIG. 3. However, there are additional peaks at 11.5 meters (which is (10+13)/2), 15.5 meters (which is (10+21)/2) and 17 meters (which is ((13+21)/2).

This information may be used to help confirm that a particular peak is indeed correct, and is not noise or an artifact of the MUSIC algorithm.

Specifically, if there is a peak at $t_1$ and a second peak is located at $t_4$, there should be another point at $t_2$ such that $(t_1+t_2)/2$ is equal to $t_4$. Solving for $t_2$, it can be seen that:

$$t_2 = 2 * t_4 - t_1.$$

Thus, if a first peak is found at $t_1$ (or $d_1$) and the next peak is found at $t_4$ (or $d_4$), if $t_1$ is a true peak, there should be another peak at $2*t_4-t_1$.

Figure 5:
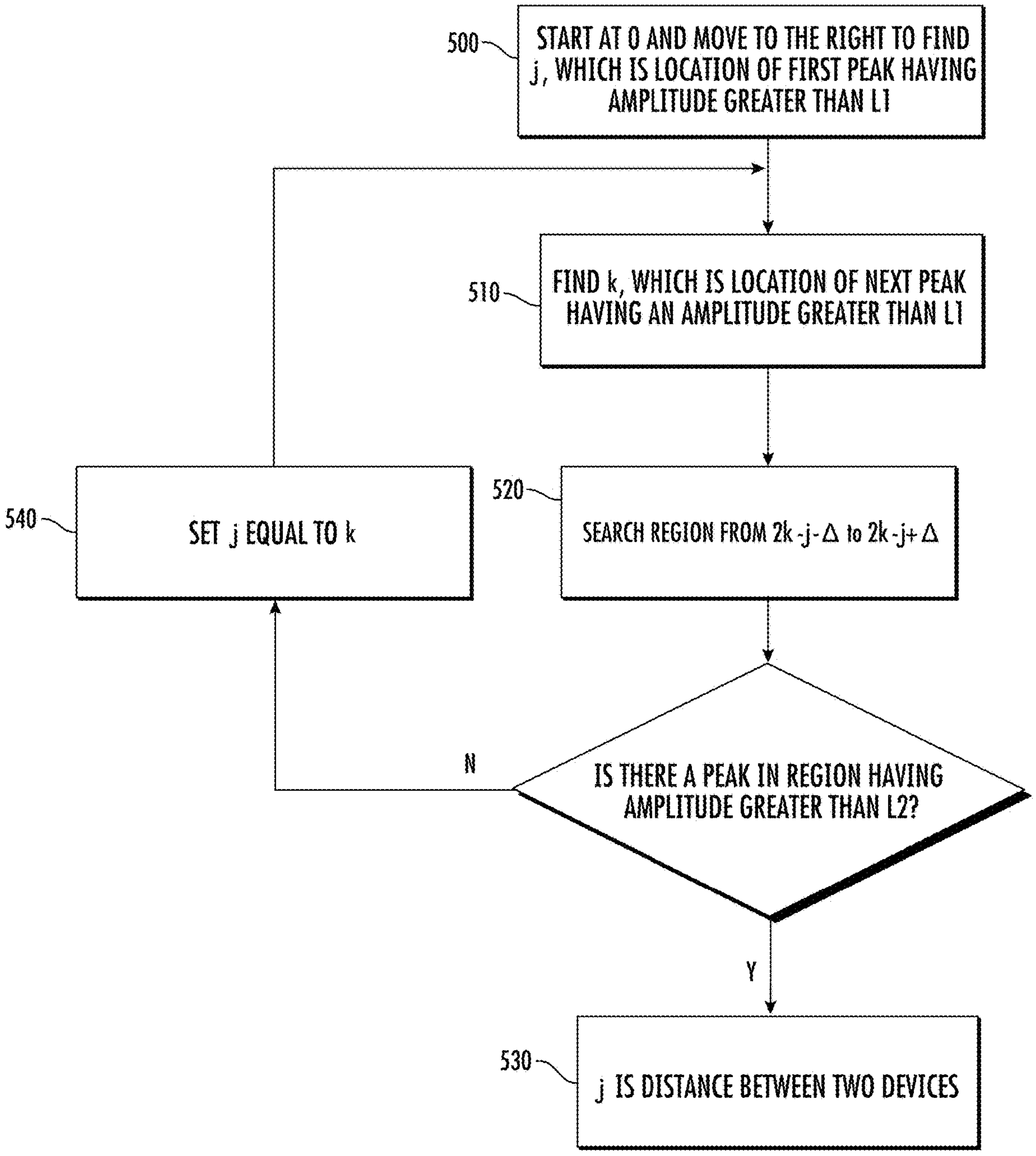
FIG. 5 shows a flowchart used to determine a distance between two wireless network devices.
Figure 6:
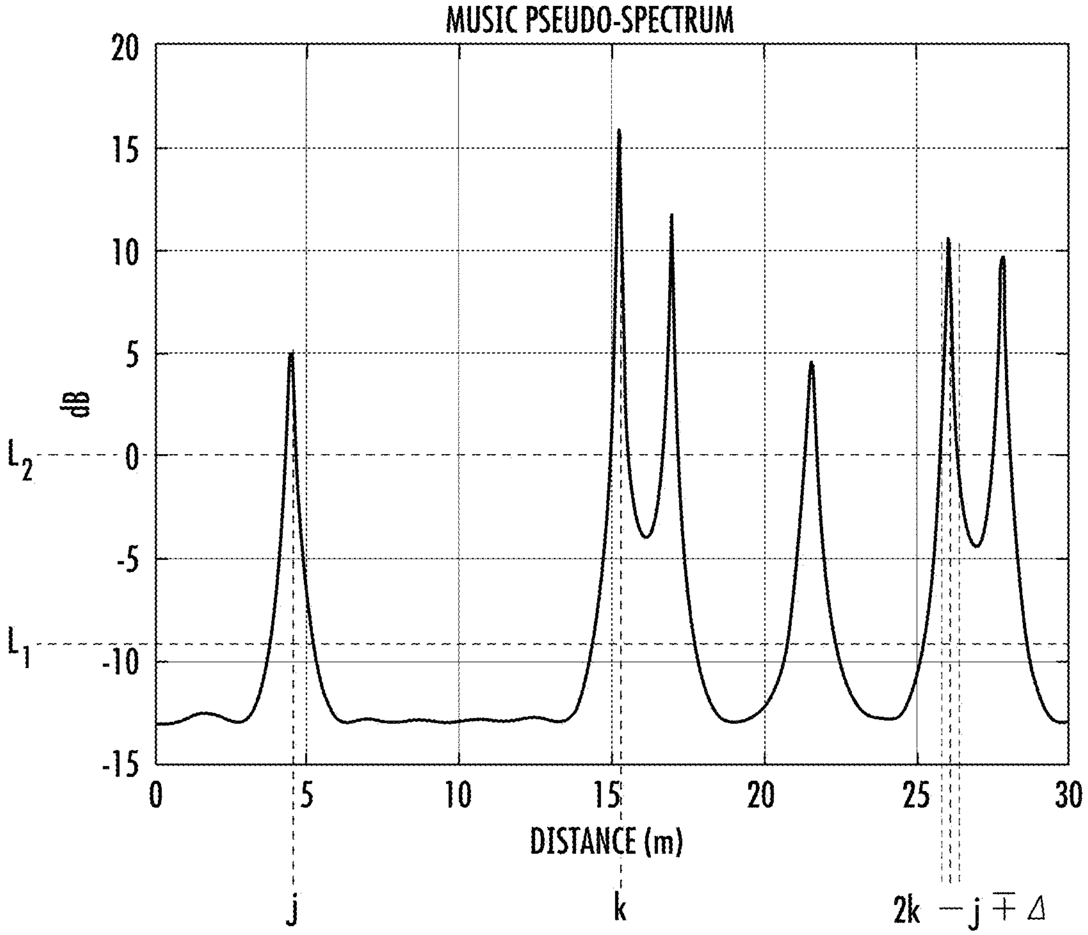
FIG. 6 shows a first pseudo-spectrum for use with the algorithm shown in FIG. 5.

FIG. 5 shows an algorithm that may be used to confirm whether a peak is real, or is noise or an artifact of the MUSIC algorithm. FIG. 6 shows a sample pseudo-spectrum that corresponds to the algorithm in FIG. 5. First, the Channel Sounding procedure is executed, and the channel transfer function is provided to the MUSIC algorithm. The MUSIC algorithm then produces a pseudo-spectrum, such as that shown in FIG. 6

As shown in FIG. 5, the algorithm begins by searching for the first peak that has an amplitude that is greater than a first predetermined threshold, L1. This search begins at 0 and proceeds toward larger distances. Further, the first predetermined threshold, L1, may be a fixed value or may be adaptive. In some embodiments, this threshold is determined empirically. In other embodiments, it is determined theoretically. Once a first peak that has an amplitude that is greater than L1 is found, it is labelled j, as shown in Box 500. Next, the algorithm continues by searching, starting at the first peak and moving toward larger distances, for the next peak that also has an amplitude that is greater than the first predetermined threshold, L1. This second peak is labelled k, as shown in Box 510.

The algorithm then defines a search region that includes the location 2k–j. In some embodiments, the location 2k–j may be at the center of the search region, which may be defined as 2k–j–Δ to 2k–j+Δ. In FIG. 6, j is roughly 4.5 meters while k is roughly 15.5 meters. Thus, in this embodiment, the search region is centered at 26.5 meters. In some embodiments, the tolerance, Δ, may be defined as an absolute number, such as 1 meter. In other embodiments, the tolerance may be defined as a percentage of the center value, such as 5%. Of course, other tolerances may be used. The algorithm then searches this search region for a peak having an amplitude greater than a second predetermined threshold, L2, as shown in Box 520. In some embodiments, L2 may equal L1. In other embodiments, L2 may be greater or less than L1. Similar to L1, L2 may be determined empirically or theoretically.

If a peak is found in this search region with an amplitude greater than L2, then j is assumed to be the correct distance between the two devices, as shown in Box 530. If, however, a peak is not found in this search region, the peak at j is disqualified, and the peak at k is now used as the prospective distance, as shown in Box 540. In this scenario, the algorithm repeats Boxes 510-540 until a correct distance is found.

Figure 7:
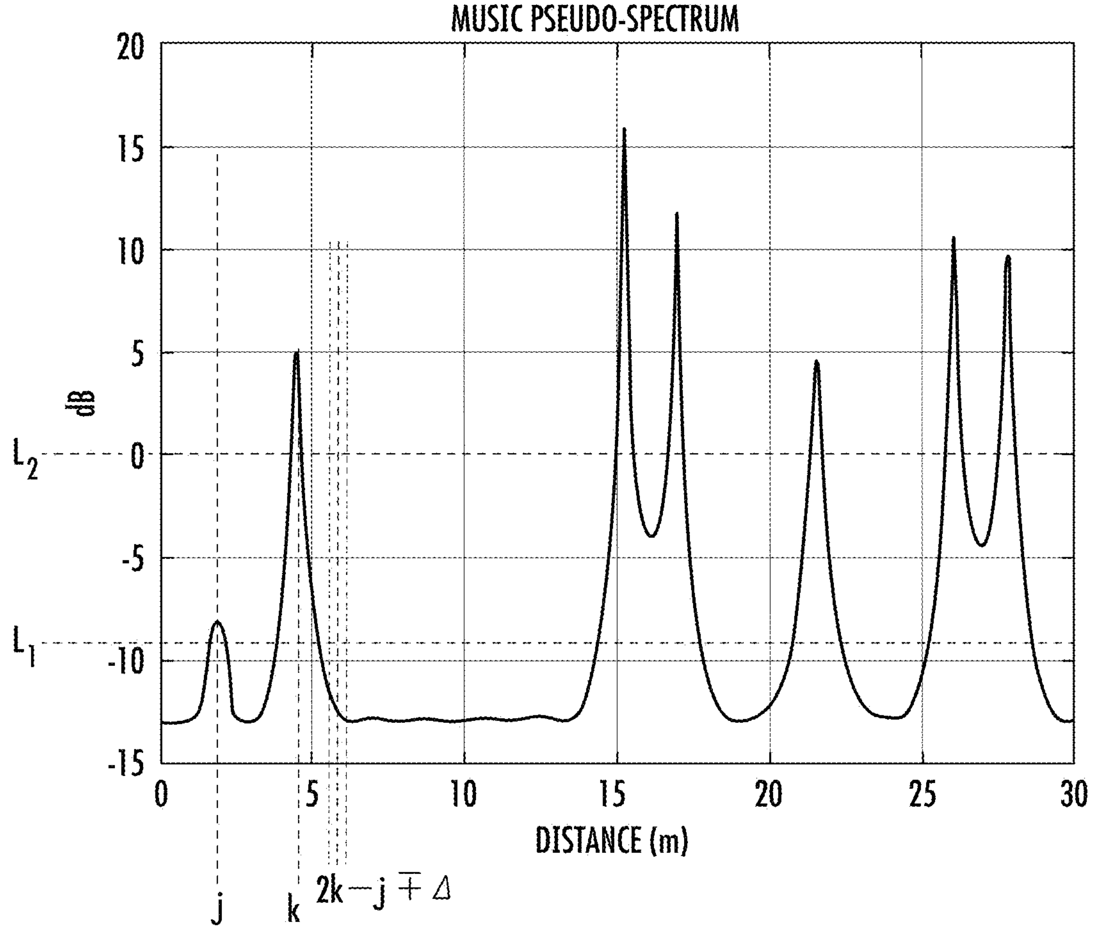
FIG. 7 shows a second pseudo-spectrum for use with the algorithm shown in FIG. 5.

FIG. 7 shows another pseudo-spectrum that includes a peak that occurs before the actual line-of-sight distance and may be considered to be noise. Using the algorithm of FIG. 5, it can be seen that j is roughly 2.5 meters, while k is 4.5 meters. Thus, the search region is defined around 2k–j or 6.5 meters. However, there is no peak in this search region. Therefore, the algorithm executes Box 540 and treats the peak that was previously designated as k as the new first peak. The algorithm now repeats and yields exactly the same result as was described with respect to FIG. 6.

Note that this algorithm may be performed by the initiator device 10. The initiator device 10 may contain the requisite computation power and memory space to perform these calculations. Alternatively, the initiator device 10 may offload the calculations to a computational device 120. For example, the initiator device 10 may provide the results of the Channel Sounding procedure to the computational device 120. The computational device 120 may then perform the MUSIC algorithm and the algorithm described above to determine the distance between the two devices.

Figure 8:
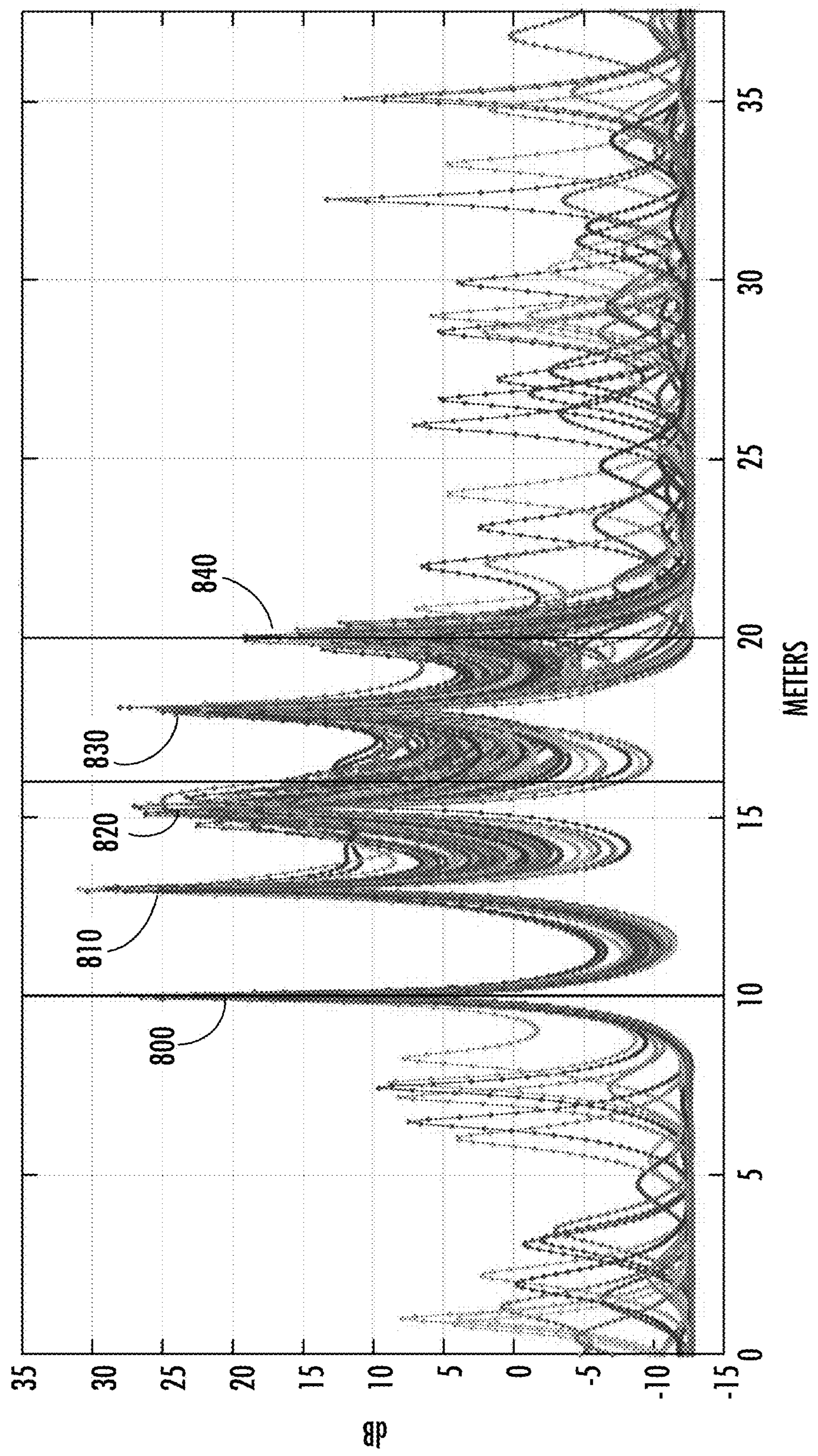
FIG. 8 shows a plurality of pseudo-spectrums generated in a noisy environment.

The present system has many advantages. In some environments, noise may create artificial peaks in the pseudo-spectrum generated by the MUSIC algorithm. For example, FIG. 8 shows 100 pseudo-spectrums that were created in the presence of noise. Peaks 800, 820 and 840 are actual paths between the two devices, with peak 800 representing the line-of-sight distance. Peaks 810, 830 represent peaks that are generated because of the use of $H^2(f)$. Note that there is a third peak that is generated due to the use of $H^2(f)$, but it aligns with peak 820. Additionally, there are a large number of smaller peaks, which are all false peaks. One approach is to increase the amplitude required to be a valid peak. For example, a threshold of 10 dB may eliminate many of the false peaks. However, it is possible that one or more false peaks exceed this threshold. Alternatively, it is possible that a true peak does not meet this threshold. The present method allows for selection of a lower threshold, since false peaks are eliminated using the algorithm of FIG. 5.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited t the present disclosure may be beneficially implemented in any number of environments for any number of purposes. Accordingly, the claims set forth below should be construed in view of the full breadth and spirit of the present disclosure as described herein.

What is claimed is:

1. A method of calculating a distance between two wireless network devices, comprising:

performing a Channel Sounding procedure at a plurality of frequencies to obtain a channel transfer function;

using the channel transfer function as an input to a MUSIC algorithm to generate a pseudo-spectrum, wherein the pseudo-spectrum comprises a plurality of peaks, each at a respective distance and having a respective amplitude;

looking for a first peak, moving from 0 toward larger distances, in the pseudo-spectrum that has an amplitude greater than a first predetermined threshold;

looking for a second peak, moving from the first peak toward larger distances, in the pseudo-spectrum that has an amplitude greater than the first predetermined threshold;

creating a search region based on the respective distances associated with the first peak and the second peak, wherein the distance associated with the first peak is j, the distance associated with the second peak is k, and the search region includes a distance of 2k-j;

determining if a peak greater than a second predetermined threshold is present in the search region; and if so, using the distance associated with the first peak as the distance between the two wireless network devices.

2. The method of claim 1, wherein if a peak greater than the second predetermined threshold is not present in the search region, the second peak is set as the first peak and the method further comprises:

looking for the second peak in the pseudo-spectrum, moving from the first peak toward larger distances, that has an amplitude greater than the first predetermined threshold;

creating a second search region based on the respective distances associated with the first peak and the second peak;

determining if a peak greater than the second predetermined threshold is present in the second search region; and if so, using the distance associated with the first peak as the distance between the two wireless network devices.

3. The method of claim 1, wherein the second predetermined threshold is equal to the first predetermined threshold.

4. The method of claim 1, wherein the search region is defined as 2k-j±Δ, wherein Δ is a tolerance.

5. The method of claim 4, wherein Δ is a fixed distance.

6. The method of claim 4, wherein Δ is a percentage of 2k-j.

7. The method of claim 1, wherein the two wireless network devices comprise Bluetooth network devices.

8. A Bluetooth network device, comprising:

a network interface;

a processing unit; and a memory device in communication with the processing unit, comprising instructions, which when executed by the processing unit enable the Bluetooth network device to:

perform a Channel Sounding procedure with a reflector device at a plurality of frequencies to obtain a channel transfer function;

use the channel transfer function as an input to a MUSIC algorithm to generate a pseudo-spectrum, wherein the pseudo-spectrum comprises a plurality of peaks, each at a respective distance and having a respective amplitude;

look for a first peak, moving from 0 toward larger distances, in the pseudo-spectrum that has an amplitude greater than a first predetermined threshold;

look for a second peak, moving from the first peak toward larger distances, in the pseudo-spectrum that has an amplitude greater than the first predetermined threshold;

create a search region based on the respective distances associated with the first peak and the second peak, wherein the distance associated with the first peak is j, the distance associated with the second peak is k, and the search region includes a distance of 2k-j;

determine if a peak greater than a second predetermined threshold is present in the search region; and if so, use the distance associated with the first peak as the distance between the Bluetooth network device and the reflector device.

9. The Bluetooth network device of claim 8, wherein the memory device further comprising instructions, which when executed by the processing unit, enable the Bluetooth network device to:

set the second peak as the first peak if a peak greater than the second predetermined threshold is not present in the search region;

look for the second peak in the pseudo-spectrum, moving from the first peak toward larger distances, that has an amplitude greater than the first predetermined threshold;

create a second search region based on the respective distances associated with the first peak and the second peak;

determine if a peak greater than the second predetermined threshold is present in the second search region; and if so, use the distance associated with the first peak as the distance between the Bluetooth network device and the reflector device.

10. The Bluetooth network device of claim 8, wherein the second predetermined threshold is equal to the first predetermined threshold.

11. The Bluetooth network device of claim 8, wherein the search region is defined as 2k-j±Δ, wherein Δ is a tolerance.

12. The Bluetooth network device of claim 11, wherein Δ is a fixed distance.

13. The Bluetooth network device of claim 11, wherein Δ is a percentage of 2k-j.

14. A network comprising:

a first Bluetooth network device acting as an initiator device;

a second Bluetooth network device acting as a reflector device; and a computational device;

wherein the first Bluetooth network device performs a Channel Sounding procedure with a reflector device at a plurality of frequencies to obtain a channel transfer function and forwards the channel transfer function to the computational device; and wherein the computational device:

uses the channel transfer function as an input to a MUSIC algorithm to generate a pseudo-spectrum, wherein the pseudo-spectrum comprises a plurality of peaks, each at a respective distance and having a respective amplitude;

looks for a first peak, moving from 0 toward larger distances, in the pseudo-spectrum that has an amplitude greater than a first predetermined threshold;

looks for a second peak, moving from the first peak toward larger distances, in the pseudo-spectrum that has an amplitude greater than the first predetermined threshold;

creates a search region based on the respective distances associated with the first peak and the second peak, wherein the distance associated with the first peak is j, the distance associated with the second peak is k, and the search region includes a distance of 2k-j;

determines if a peak greater than a second predetermined threshold is present in the search region; and if so, uses the distance associated with the first peak as the distance between the first Bluetooth network device and the second Bluetooth network device.

15. The network of claim 14, wherein if a peak greater than the second predetermined threshold is not present in the search region, the second peak is set as the first peak and the computational device:

looks for the second peak in the pseudo-spectrum, moving from the first peak toward larger distances, that has an amplitude greater than the first predetermined threshold;

creates a second search region based on the respective distances associated with the first peak and the second peak;

determines if a peak greater than the second predetermined threshold is present in the second search region; and if so, uses the distance associated with the first peak as the distance between the first Bluetooth network device and the second Bluetooth network device.

16. The network of claim 14, wherein the search region is defined as 2k-j±Δ, wherein Δ is a tolerance.

17. The network of claim 16, wherein Δ is a fixed distance or is a percentage of 2k-j.

* * * * *